United States Patent [19]

Welsh

[11] Patent Number: 4,829,558

[45] Date of Patent: May 9, 1989

[54] SYSTEM AND DEVICE FOR DATA TRANSMISSION, AND RELATED METHOD

[75] Inventor: Russell J. Welsh, Toronto, Canada

[73] Assignee: PEAC Media Research, Inc., Toronto, Canada

[21] Appl. No.: 145,078

[22] Filed: Jan. 19, 1988

[51] Int. Cl.⁴ .......................................... H04M 11/00
[52] U.S. Cl. ........................................ 372/92; 455/2; 358/84
[58] Field of Search .................... 379/92, 93, 96, 106; 455/2, 5; 358/84, 85, 86

[56] References Cited

U.S. PATENT DOCUMENTS

| | | | |
|---|---|---|---|
| Re. 31,951 | 7/1985 | Johnson et al. | 364/900 |
| 3,366,731 | 1/1968 | Wallerstein | 178/6 |
| 3,639,686 | 2/1972 | Walker et al. | 178/5.8 R |
| 4,126,762 | 11/1978 | Martin et al. | 179/2 A |
| 4,186,413 | 1/1980 | Mortimer | 358/146 |
| 4,264,924 | 4/1981 | Freeman | 358/86 |
| 4,308,554 | 12/1981 | Percy et al. | 358/84 |
| 4,355,205 | 10/1982 | Walker | 179/2 A |
| 4,377,870 | 4/1983 | Anderson et al. | 455/2 |
| 4,567,511 | 1/1986 | Smith et al. | 358/84 |
| 4,573,072 | 2/1986 | Freeman | 358/86 |
| 4,584,602 | 4/1986 | Nakagawa | 379/92 |
| 4,630,108 | 12/1986 | Gomersall | 358/84 |
| 4,658,290 | 4/1987 | McKenna et al. | 358/84 |
| 4,694,490 | 9/1987 | Harvey et al. | 380/20 |
| 4,745,468 | 5/1988 | Koborn | 455/2 |

Primary Examiner—Stafford D. Schreyer
Attorney, Agent, or Firm—Faegre & Benson

[57] ABSTRACT

A system for remotely displaying screen data on televisions or the like transmits screen data over a plurality of commercial radio band carrier transmitters. A plurality of devices are provided, each being for use with a corresponding television in a home. Each device includes a band receiver and a decoder for receiving and decoding screen data. A display signal is then generated for viewing on the television or the like. Each device can include means for receiving responses from a user, for example responses to a program viewed. The device can also include a storage for storing both screen data and response data. This enables response data to be transmitted at a later time, and it can be collected by polling from a central computer. Similarly, screen data can be received and stored, for later viewing.

55 Claims, 3 Drawing Sheets

SYSTEM AND DEVICE FOR DATA TRANSMISSION, AND RELATED METHOD

FIELD OF THE INVENTION

The present invention relates to a system for transmitting data and more particularly to the transmission of data for display in a remote location.

BACKGROUND OF THE INVENTION

Systems for transmitting data, collecting responses to that data and storing the responses in a form where the responses can be analyzed have long been a concern in the art. Such systems can, for instance, be used by polling and rating services. Many other uses such as accessing central database information systems will be evident to those who have worked in this area.

In the consumer field, such polls are used, for example, to determine consumer preferences for selected products, services, television programs or channels.

Research services have traditionally used several different methods in which to collect their responses. One of these methods is to send out questionnaires in the form of letters requesting responses. This is very expensive and time consuming as the letters have to be addressed, sent, received, completed, returned, and then responses have to be manually analyzed or entered into a computer by the research company. Also, since a fair amount of time is required by the consumer to complete the response, response rates can be low and inaccurate. Another form of surveying is orally by telephone. The labour cost is high in performing the telephone calls and again manual calculation or entry of responses is necessary for the company.

Another traditional data collection method is to provide the participants in the surveys with diaries. The participants must keep track of what they watch or the products they use and enter their responses into the diary. The diaries are then collected and the responses are manually analyzed or entered into a computer. This is a very cumbersome procedure both for the participant and the company.

In the electronic age many systems have arisen in an attempt to simplify procedures for both the companies and the participants.

Bar code readers allow surveyors to keep track of products which have been coded with a universal product code. The response data read by the readers is stored in a data base which may be sold to companies interested in the products covered by the survey. In practice this system is normally non-discriminatory. For instance, if a bar code reader is placed in a grocery store normally all of the products coming out of the store are entered into the data base. Although this provides for a great deal of useful data it additionally stores a great deal of unusable data. The data base becomes very large, expensive and cumbersome to use.

One system for determining television ratings is totally automated. A hardware device is hooked directly to and monitors the use of the channels of a television. The information is sent over a dedicated telephone line to a central computer. Although the system is fully automated the hardware implementation can be quite costly and only gives specific information related to the time of viewing, length of viewing and the channel viewed.

Systems for providing moment to moment audience responses to an event are particularly useful. Known systems require the event to be performed in a room equipped with devices enabling each participant to input his/her response, e.g. by means of buttons corresponding to different responses. The response data would be collected by a computer and combined with the known demographics of the viewers and synchronized to the event. Obviously this system requires the participants to travel to a central location. At the location the event is performed in a setting foreign to the participant which may alter the reliability of his or her responses.

It has been previously very expensive to do on-line telephone moment to moment audience surveys. For example, a dedicated telephone line would be needed for each member of the audience.

In the area of information systems present applications include accessing central data bases using a personal computer and a modem. The system operator creates and maintains a data base in a host computer and normally controls access via passwords issued to authorized users. While connected to the host computer, the users requests and the hosts answers are passed back and forth through the telephone network. Users can be charged on a subscription and/or a connect time basis. This system facilitates access to an unlimited amount of data, however the system requires each user to invest in a personal computer, the software required to operate the computer and a modem.

Furthermore users must be educated in how to dial up, sign on, and search for the desired information. This system is more appropriate for sophisticated computer users with specialized, non-standard information needs.

Furthermore for mass dissemination of information the personal computer information systems require each user to access the central data base using a telephone line. This ties up the users telephone as well as the telephone system and requires the host computer to have a large number of access ports.

In order to simplify the personal computer system dedicated information access systems which are designed to be more user friendly have been developed. The user needs only to enter numeric responses in a key pad to undertake a search. These systems have generally used graphics based screens requiring a lengthy drawing session for each screen. Also the receivers and decoders that were specially designed for the systems have costs well above mass market appeal. As for all user to host access systems, each user ties up a telephone line and a host computer access port.

Another information system transmits its information in a normally unused portion of the vertical blanking interval of a regular television signal. A viewer must be equipped with a special docoder to view the information. A severe constraint of the vertical blanking interval systems is the limited bandwidth. Typically, a loop of pages is transmitted. If the access time is to be reasonable only a limited number of pages can be transmitted.

Other systems have employed the cable television service available in most cities throughout North America. Unfortunately not all homes are provided with basic cable service. Very few homes are provided with two-way cable systems eliminating interactive applications.

Some information systems have employed the FM band for transmitting information. None of these systems has incorporated an interactive return path component. Additionally some of these systems are designed to transmit only small data bursts on an irregular basis as opposed to maintaining an open channel for continuous delivery.

SUMMARY OF THE INVENTION

In a first aspect the invention provides a system for remotely displaying screen data as screens on viewing apparatus, the system comprising: a plurality of commercial radio band carrier transmitters, each of the transmitters encoding and transmitting screen data on differing commercial radio band carriers; and a plurality of devices each being for use with a corresponding viewing apparatus and comprising a band receiver adapted to receive an encoded band carrier and including a band tuner for tuning the band receiver to a selected band carrier, a band carrier decoder connected to the band receiver, the band carrier decoder being adapted to decode the screen data from the received band carrier, and a display signal means connected to the band carrier decoder, the display signal means being adapted to produce from the screen data a display signal representing the screens to be displayed; whereby each viewing apparatus when connected to the display signal means of a respective device accepts the display signal and displays the screens.

In the second aspect the invention provides a device for use in an interactive system for remotely viewing screen data as screens on a viewing apparatus, the screen data being encoded and transmitted on one of a plurality of commercial radio band carriers, and for remotely transmitting responses from a viewer as response data to a central computer via a response data encoded telephone carrier, the device comprising: a band receiver adapted to receive the encoded band carrier, and including a band tuner for tuning the band receiver to a selected band carrier; a band carrier decoder connected to the band receiver, the band carrier decoder being adapted to decode the screen data from the received band carrier; and a display signal means connected to the band carrier decoder, the display signal means being adapted to produce from the screen data a display signal representing the screens to be displayed; a response data input means, including a viewer control means, the response data input means accepting responses from the viewer and translating the responses into response data; and a first telephone carrier encoder connected to the response data input means, the telephone carrier encoder being adapted to encode a telephone carrier with the response data; whereby a viewing apparatus when connected to the display signal means accepts the display signal and displays the screens; and the response data can be transmitted to the central computer by the telephone carrier encoder when a telephone line is connected between the telephone carrier encoder and the central computer.

In a third aspect, the invention provides a method for remotely displaying screen data as screens on a viewing apparatus, the method comprising: encoding and transmitting screen data on differing commercial radio band carriers; tuning and receiving a selected band carrier; decoding the screen data from the selected band carrier; and producing from the screen data a display signal representing the screens to be displayed; whereby the screens may be displayed on the viewing apparatus when the viewing apparatus accepts the display signal.

As an alternate aspect of the present invention, instead of the presence of multiple transmissions of commercial radio band carriers, there can be provided, in each device, a storage means for storing both responses and screen data. This is applicable to the system, the device and the method of the present invention.

The provision of a storage for screen and response data has many advantages. For screen data, it enables the user or viewer to instruct the later recordal of favoured information segments. These can be viewed at a time suitable to the viewer. This can also give the user rapid access to the selected segments and relieve pressure on the overall capacity of the system.

Storing response data relieves demands on a common telephone line. It can further enable response data to be automatically uploaded by a central computer. This can either be done on the viewer's instructions, or the central computer can sequentially poll a number of installations or households to collect the information.

The commercial radio band transmitters preferably use a subcarrier in the FM radio band 88-108 MHz. Alternatively, the carrier could be in the VHF or UHF television band frequencies and the cable television frequencies 54-450 MHz.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention, and in which.

DETAILED DESCRIPTION OF THE DRAWINGS

The preferred embodiment of the present invention will be described with relation to its application as a polling system, however it is to be understood that the invention is not limited to this use. Other embodiments within the scope of the invention could among other things include applications for travel reservation, advertisement, real estate listing, pay TV per program and home shopping services.

Figure 1:
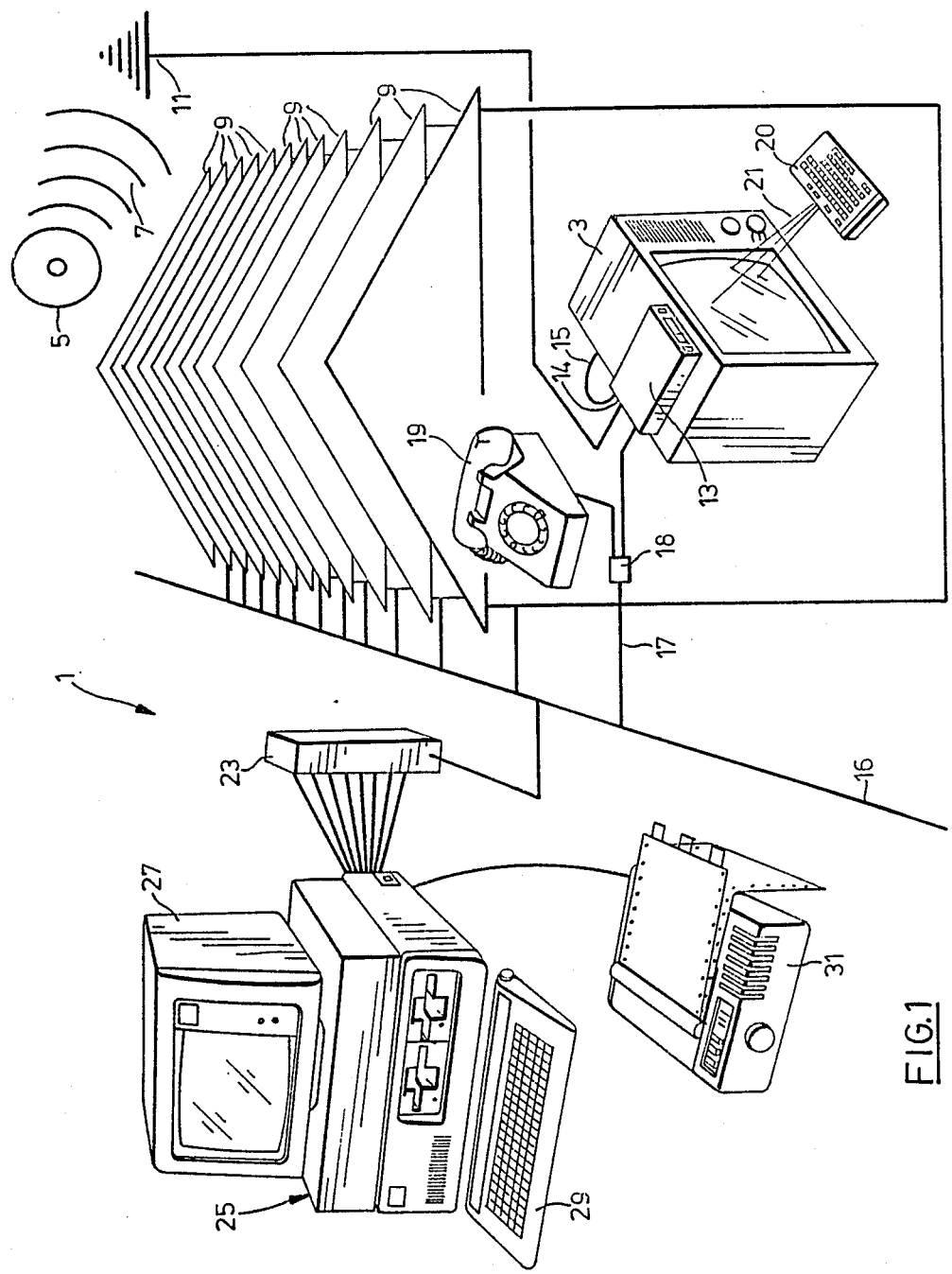
FIG. 1 is a schematic diagram of the major components of an interactive polling system.

Reference will now be made to FIG. 1 in describing an overall interactive remote polling system 1.

The system 1 is designed to display a questionnaire in the form of a series of screens on a viewers television 3. Other viewing apparatuses, such as a monitor, may be employed, but a television would be most commonly used as almost every home has one. One source of the screens which are to be ultimately displayed on the television 3 is one or more FM broadcast stations 5 (shown schematically). The screens are transmitted in the form of FM band carriers of different frequencies encoded with screen data, as indicated by the radial lines 7. The screen data is typically comprised of, but not limited to, text characters. The use of text screens lessens the amount of screen data which is required to be transmitted and, as we shall later see, stored and/or displayed. Alternatively, the FM carrier may be transmitted through an FM cable system, not shown.

Although the preferred embodiment has been limited to FM band carriers, the present invention is not limited to FM band carriers, but can be designed to employ any commercial radio frequency carriers.

The FM band carriers will be picked up by the antennas 11 on a number of chosen homes 9. The antennas 11 are connected each to a respective polling device 13 within each of the homes 9. Additionally, the subscribers standard broadcast television signal comes through a cable or antenna connection system 14 to the polling device 13.

The screen data transmitted on the FM band carriers can be addressed to an individual polling device 13 or broadcast to all the polling devices 13 in each of the homes 9. The screen data transmitted on the FM band carriers can be transmitted multiple times in order to ensure that it is received correctly by the polling devices 13. As an alternative, the screen data can be transmitted as a continuous loop, which the polling device 13 can enter at any time.

The polling device 13 is connected to the subscribers television 3 through a connector 15.

An alternate source of screens, and a response communication link, for the polling device 13 is the general telephone system 16 connected through the subscribers telephone line 17 and a dual telephone socket 18. A telephone 19 for the subscribers use is also connected to the subscribers telephone line 17 through the other socket of the dual telephone socket 18.

An infrared transmitter 20 is coupled by infrared signals, shown by lines 21, to the polling device 13. The infrared transmitter 20 is the means by which a viewer can control certain functions of the polling device 13 and the system 1. The actual amount of control over the system 1 for the infrared transmitter 20 will depend on the specific application of the system 1. For instance, when the system 1 is a remote polling system the transmitter 19 may be able to turn the device 13 on, choose the source of the screens, and input responses to the questions appearing on the screens. The transmitter 20 has 28 buttons for cursor control, numerical entry and other general and specific functions.

Also connected to the general telephone system 15 through a modem 23 is a central computer 25. Although not shown, the central computer 25 is additionally connected to the FM broadcast stations 5 to control the routing of screen data to the FM band carriers of the broadcast stations 5. The scheduling of the broadcasting of screen data encoded FM carriers is also controlled by the central computer 25. The screen data is transferred as a continuous data stream to the FM broadcast stations 5 over high speed dedicated transmission lines. At each broadcast station 5 an addressable control unit modulates and encodes the screen data for that station onto the particular FM band carrier for that station 5.

Depending on the amount of information to be processed by the computer 25 it may be a personal computer 25 as shown. The computer 25 has connected to it a monitor 27, a keyboard 29 and printer 31 for monitoring and manipulating the information contained therein.

Figure 2:
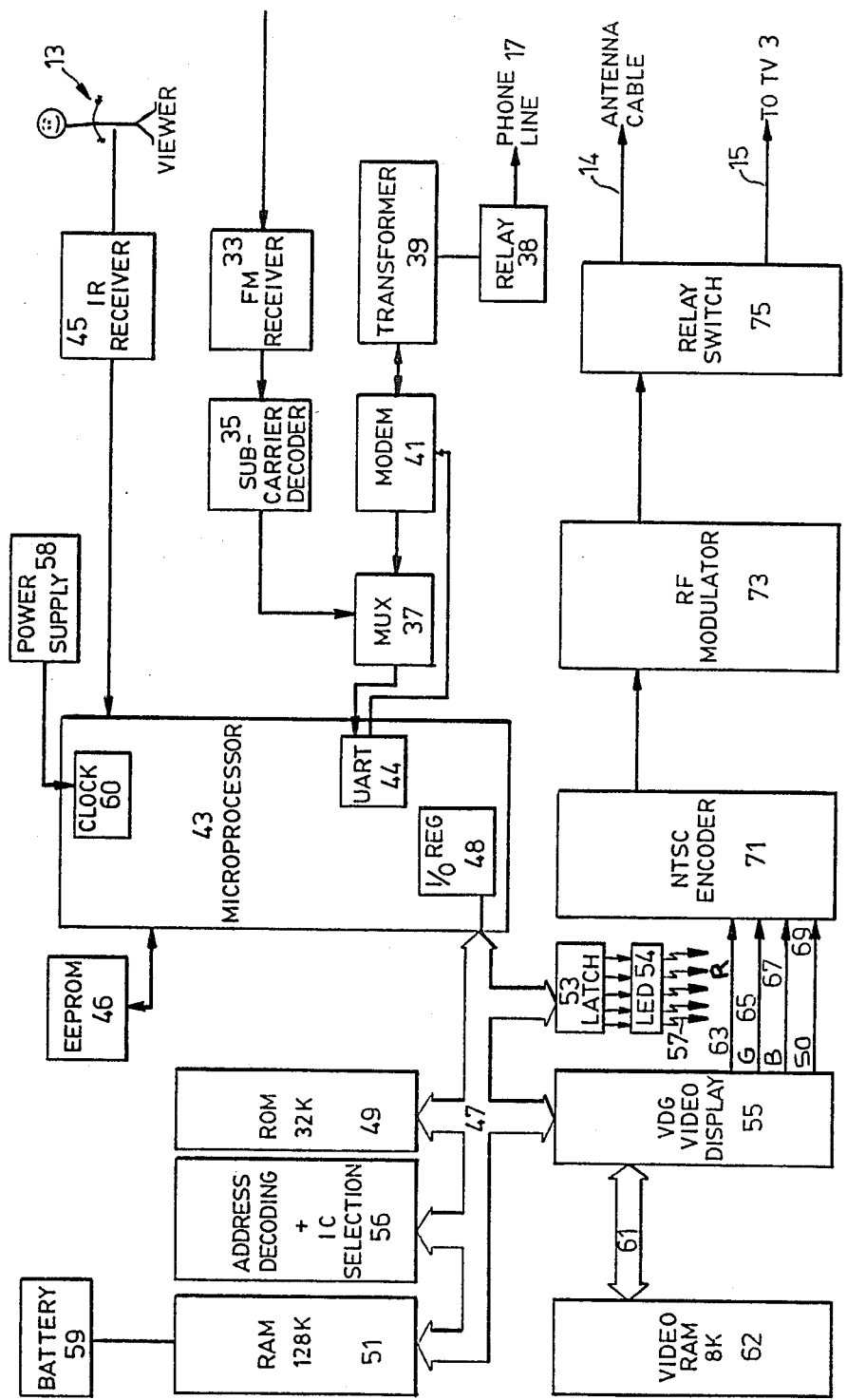
FIG. 2 is a block diagram of the internal data and address path structure of a polling device employed in the polling system of FIG. 1.

Reference will be made to FIG. 2 in describing the internal data and address path structure of the polling device 13 for one home 9.

As stated, the screen data enters the device 13 from the FM antenna 11 or through the telephone line 17. The FM antenna 11 is connected to an FM receiver 33. The FM receiver 33 is connected to an FM decoder 35, which is then connected to a multiplexor 37.

The other source of screen data, the telephone line 17 is connected through a relay 38 and a transformer 39 to a modem 41. The modem 41 used in the preferred embodiment was a full duplex 1200 band modem 41. The modem is then connected to the multiplexor 37. The modem 41 has associated circuitry, not shown, which is capable of sensing an attenuation in a signal being transmitted from the modem 41. The attenuation when sufficient is assumed to be caused by the viewer's telephone 19 going off-hook. When the telephone 19 is off-hook the modem 41 disconnects from the subscriber's telephone line 17 to allow the subscriber to use the telephone 19. This feature saves the cost of having to install a dedicated telephone line for the device 13 as for most interactive prior art systems. The connection may be made again at a later date to continue transmission.

The multiplexor 37 is connected to a microprocessor 43 through a universal asynchronous receiver/transmitter (UART) 44.

A direct connection is provided from the UART 44 in the microprocessor 43 to the modem 41 to allow response data to be transmitted to the central computer 25 through the modem 23 from the UART 44. The microprocessor 43 used in the preferred embodiment was an 80C31, but other microprocessors having similar capabilities as described herein would be suitable.

An infrared receiver 45 is capable of taking input in the form of response data from the infrared transmitter 20. The infrared receiver 45 is connected to the microprocessor 43.

The microprocessor 43 is connected to an electrically erasable programmable read-only memory (EEPROM) 46. The EEPROM 46 stores the telephone number of the modem 23 at the central computer 25, an encoded address of the home 9 in which it is situated and a password. The material is stored in the EEPROM 46 in case of a prolonged power outage.

The microprocessor 43 is also connected to an address and data bus 47 through a number of general purpose input/output (I/O) registers 48 in the microprocessor 43. For the system 1 described the address portion of the bus was sixteen bits wide while the data portion was eight bits wide. Also connected to the bus 47 are a 32K read-only memory (ROM) 49, a 128K random access memory (RAM) 51, a latch 53, a video display generator 55, and an address decoding and integrated circuit selection circuitry 56. The latch 53 is further connected to a light emitting diode (LED) display 54 having 5 LED's, not shown. The emissions of the LED's are shown by the arrows 57.

Each of the components in the polling device 13 is powered by a power supply 58. The power providing connections have not been shown in any of the figures as they are conventional and showing them would unduly complicate the figures. The power supply 58 is plugged into a typical home 60Hz supply line. The RAM 51 is battery backed-up by a battery 59 in case of a power outage.

In addition to providing power, the power supply 58 provides a 60 Hz square wave signal to the microprocessor 43, as illustrated by the connection in FIG. 2. The microprocessor 43 has an internal time of day clock 60 which is updated by the square wave signal.

An address and data path 61 connects a video RAM 62 to the video display generator 55.

The video display generator 55 has red, green, blue, and sync signal outputs 63, 65, 67, and 69 connected to an NTSC encoder 71. The NTSC encoder 71 is connected through a radio frequency (RF) modulator 73 to a RF relay switch 75. The other input to the RF relay switch 75 is the standard broadcast signal through the antenna or cable connection system 14.

The output of the RF relay switch 75 is then output to the television 13 through the connector 15.

Figure 3:
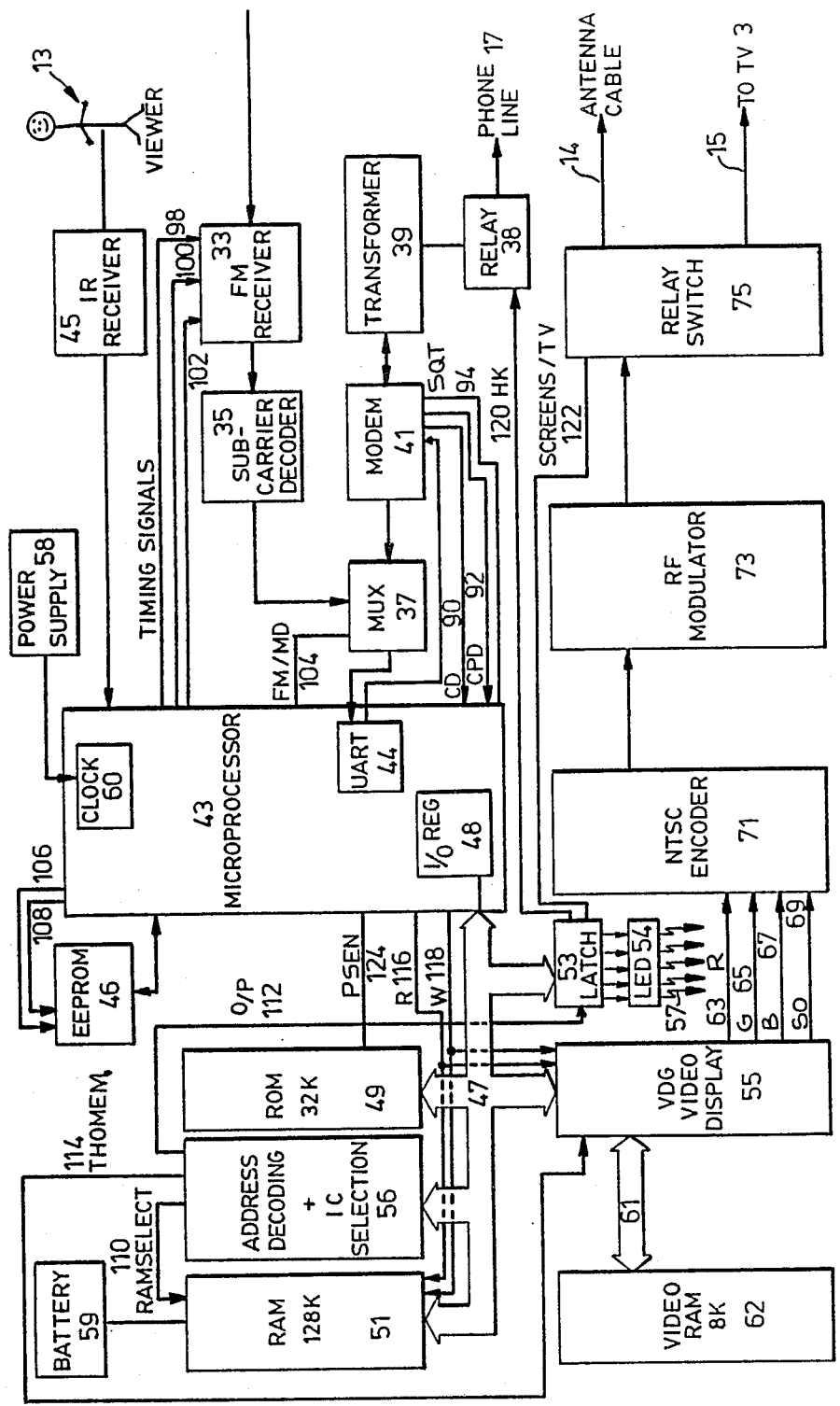
FIG. 3 is the block diagram of FIG. 2 with the major control signals of the polling device added.

Reference will now be made to FIG. 3. FIG. 3 is similar to FIG. 2 with the major control signals for the device 13 added.

The modem 41 is a 1200 bit per second full duplex modem 41. The modem 41 can modulate, encode, and send response data encoded telephone carriers. Additionally the modem 41 can receive, demodulate, decode and forward screen data from a screen data encoded telephone carrier. Response data for the modem 41 originates in the UART 44 and is sent through the transformer 39, relay 38, and the subscribers telephone line 17 to the general telephone system 15. Received screen data encoded telephone carriers are picked up from the general telephone system 15 by the subscribers telephone line 17 and sent through the relay 38, transformer 39, modem 41 and multiplexor 37 to the UART 44.

The modem 41 has three control signal lines: carrier detect 90, call progress tone detect 92 and squelch transmitter 94. The squelch transmitter signal 94 is used to turn the modem 41 on and off. When the modem 41 is turned on it can receive and transmit signals. The carrier detect signal 90 signals the microprocessor 43 that a data encoded carrier exists on the subscribers telephone line 17. The call progress tone detect 92 informs the microprocessor 43 when it dials a phone number if it is receiving a ringing signal or a busy tone from the dialed number.

The FM receiver 33 is controlled by a set of three signals from the microprocessor: SDO 98, SYNEN 100 and SYNCL 102. These signals 98, 100, 102 tune the receiver 33 to a desired band carrier frequency.

The source for the multiplexor 37 is controlled by an FM receiver/modem select signal 104 from the microprocessor 43.

The EEPROM 46 can be read and written by the microprocessor 43. The reading and writing functions are controlled by EEPROM clock and EEPROM enable signals 106, 108. The enable signal 108 enables the EEPROM 46 to accept signals on the EEPROM clock line 106 and the serial data connection of FIG. 2. The clock signal 106 allows the EEPROM 46 to be read or written, the command and the address are specified by the microprocessor 43 on the serial data connection. EEPROM write data will follow a write command on the serial data connection. The read EEPROM data is output to the microprocessor 43 by the EEPROM 46 through the serial data connections following a read command.

The circuitry 56 as its name suggests picks up addresses sent by the microprocessor 43 to the bus 47. The addresses are decoded by the circuitry 56. If the address belongs to the RAM 51, the video display generator 55 or the latch 53 then that chip 51, 53 or 55 is signaled.

The RAM 51 is signaled through a RAM select line 110. The RAM select line 110 is actually four lines, not shown, as the RAM 51 has four 32K memory chips, not shown, to make up 128K of memory.

The latch 53 is signaled by an output signal 112 connected to the enable input of the latch 53.

The video display generator 55 is signaled by a THOMEM signal 114.

When one of the chips 51, 53 or 55 is selected the address to be addressed in the chip 51, 53 or 55 is read from the bus 47. As the chip 51, 53 or 55 signaled by the signal line 110, 112 or 114 is not enabled until after the address has been decoded by the circuitry 56, and only a portion of the address lines, not shown, of the bus 47 is employed in the circuitry 56, the other address lines, not shown, must be delayed by a delay flip flop, not shown, to arrive at the chip 51, 53 or 55 at the appropriate time.

The RAM 51 and the video display generator 55 are informed of the function they are to perform at the address specified on the bus 47, with the data which follows on the bus 47, by a read signal 116 or a write signal 118 from the microprocessor 43.

When the microprocessor 43 wishes the modem 41 to connect through the subscribers telephone line 17 and the general telephone system 15 to the modem 23 and the computer 25, the relay 38 is opened and closed to perform pulse code dialing. The relay 38 is controlled by a HK signal 120 from the latch 53. The HK signal 120 is addressed through the latch 53 by the microprocessor 43 as described above.

To select between standard broadcast television and the screens from the polling device 13, the RF relay switch 75 is switched between the signal from the RF modulator 73 and the standard broadcast television signal. The RF relay switch 75 is controlled by a screen/television signal 122 from the latch 53. The screen/television signal 122 is addressed by the microprocessor 43 through the latch 53 as described above.

A program, not shown, is stored in the ROM 49 and oversees the operation of the polling device 13. The ROM is signaled directly by the microprocessor over a programmable ROM select enable line 124 and addressed by the microprocessor 43 through the bus 47.

In operation, the polling device 13 can take on a number of different modes, four of which will be described. These four modes are on-line FM, on-line telephone, local FM and local telephone. As will become evident to those skilled in the art, other modes of operation are possible by combining various features of the four modes to be described.

In the on-line telephone mode the viewer uses the transmitter 19 to request the on-line telephone mode. The polling device 13 receives the request through the infrared receiver 45. The infrared receiver 45 amplifies the request and forwards it to the microprocessor 43. The microprocessor 43 will then dial the central computer 25. The dial operation will begin with the microprocessor 43 reading the phone number of the central computer from the EEPROM 46. The microprocessor 43 then opens and closes the relay 38 via the latch 53. When the modems 23 and 41 are connected the carrier detect signal 40 notifies the microprocessor 43. The microprocessor 43 then selects the telephone source for the multiplexor 37. Screen data is then encoded and forwarded from the central computer 25 through the modem 23 to the modem 41. The modem 41 decodes the screen data and forwards it to the UART 44.

The screen data is actually preceded by a data password from the central computer 25. The microprocessor 43 compares the password to the password in the EEPROM 46. If the password is matched the microprocessor 43 selects the video display generator 55 via the THOMEN signal 114, and signals a write operation via the write signal line 118. If the password is incorrect the screen data will not be recognized by the microprocessor 43. The password feature ensures the actual recipient of screen data is the intended recipient and allows individual polling devices 13 to be selectively addressed.

The microprocessor 43 sends out the screen data from the I/O registers 48 over the bus 47 to the video display generator 55. The video display generator 55 stores the present screen in the video RAM 62. The screen in the video RAM 62 can be used to refresh the video display generator 55 if the screen data has not changed from the microprocessor 43 by the time the screen is to be over-written by the video display generator 55.

The output of the video display generator is in the video form of red, green, blue and sync signals 63, 65, 67, 69. The signals 63, 65, 67, 69 are NTSC encoded by the NTSC encoder 71. The RF modulator 73 modulates the NTSC encoded signal onto a given VHF television carrier. Usually the carrier will be one of channels 2, 3 or 4.

The microprocessor 43 through the latch 53 signals the RF relay switch 75 to send the display signal to the television 3 as described above.

Responses, if any, to the on-line screens are input through the infrared transmitter 20 by the viewer. The polling device 13 receives the response data from the transmitter 20 through the infrared receiver 45. The infrared receiver 45 amplifies the response data and sends it to the microprocessor 43.

When responses are ready to be transmitted the microprocessor 43 signals the modem 41 to turn on via the signal 94. The response data is then transmitted over the response data path to the modem 41 directly from the microprocessor 43. The modem 41 modulates the response data and sends it through the transformer 39 and the relay 38 to the central computer 25.

The central computer 25 records the responses and transmits further screen data depending upon the requirements of the questionnaire being completed and the responses received.

In the local telephone mode, the receiving of screen data is similar to that for the on-line telephone mode except the process is commenced at a given time on the clock 60 and not by the viewer.

At the given time the microprocessor 43 has the central computer 25 dialed up as described previously. The screen data is then sent all at once to the microprocessor 43.

The screen data is not immediately sent to the video display generator 55 for display, instead the microprocessor 43 selects, via the circuitry 56 and the RAM select signals 110, the RAM 51. The address in the RAM 51 is placed on the bus 47 from the I/O registers 48. The operation is a write specified by the write signal 118. The screen data to be written into the RAM 51 is placed from the I/O registers 48 onto the bus 47.

The use of text characters, as opposed to graphics, reduces the amount of information necessary to be stored by the RAM 51. As a result the RAM 51 may be a relatively small size while storing a relatively large number of screens. As discussed previously, the RAM 51 is 128k. This will hold approximately 600 screens although a portion of the RAM 51 is dedicated to storing response data when necessary. Previous systems in the art tended to use graphics information requiring large amounts of transmitted data. Reduction in the amount of necessary RAM produces corresponding reduction in size and cost.

An LED on the LED display 54 may be caused to light up by the microprocessor 43 through the latch 53 as described previously. This makes the viewer aware that a questionnaire is resident in the polling device 13 for viewing.

When the viewer desires to have the screen displayed he or she does not have to wait for the screens to be received as the screens are already in the RAM 51. The viewer selects local telephone mode through the transmitter 20. The microprocessor 43 then selects the RAM 51, but this time requests a read operation via the read signal 116. The microprocessor 43 also selects the video display generator 55 and requests a write operation via the write signal 118. Screen data from the RAM 51 is then written to the video display generator 55 by the microprocessor 43 over the bus 47. The present screen is stored in the video RAM 62 for refresh purposes as before.

Responses are input from the transmitter 20 as before, but are stored in the RAM 51 as response data in a manner similar to that for the incoming screen data.

Additional screen data is output for viewing on the television 3 according to the requirements of the questionnaire and the responses input by the viewer.

At a later time the response can be remotely read by the central computer 25. The microprocessor 43 at a given time on the clock 60 dials the central computer as described before. The microprocessor 43 then reads the stored responses from the RAM 51 and sends them from the UART 44 to the central computer 25.

In the off-line FM mode the receiving of screen data is commenced at a given time on the clock 60 and not by the viewer. At the given time the microprocessor 43 tunes the FM receiver 33 to receive a pre-selected FM band carrier via the signals 98, 100, 102 and selects the FM input to the multiplexor 37 via the FM receiver/modem select 104. The FM receiver 33 receives the screen data encoded FM carrier and forwards it to the FM decoder 35. The FM decoder 35 decodes the screen data from the carrier and forwards the screen data to the UART 44 through the multiplexor 37.

As for the off-line telephone mode, all of the required screens for a given questionnaire are transmitted and stored in the RAM 51 along with the necessary branching information. Again, similar to the off-line telephone mode, one of the LEDs on the LED display 54 can be illuminated to indicate that screen data has been received and is now available for access. The further operation of the off-line FM mode is similar to that for the off-line telephone mode.

In the on-line FM mode the viewer employs the transmitter 19 to request on-line FM. The polling device 13 receives the request through the infrared receiver 45. The infrared receiver amplifies the request and forwards it to the microprocessor 43. The microprocessor 43 decodes the request, tunes the FM receiver 33 to receive the selected FM band carrier via the signals 98, 100, 102 and selects the FM input to the multiplexor 37 via the FM receiver/modem select 104. The FM receiver 33 receives the screen data encoded FM carrier and forwards it to the FM decoder 35. The FM decoder 35 decodes the screen data from the carrier and forwards the screen data to the UART 44 through the multiplexor 37.

The screen data is displayed as screens on the television 3 as it is received in a manner similar to the operation in the on-line telephone mode.

The viewer responses to the screens viewed are stored in the RAM 51 in a manner similar to that for the on-line telephone mode. The response to each individual screen causes the microprocessor 43 to search for the next requested screen and to display that screen when it is received. The stored response data can be transmitted to the central computer 25 in a manner similar to that for the off-line telephone mode.

Moment to moment surveys tracking viewer responses and correlating the responses to an event occurring at a specific time may be performed using any one of the four modes described. This could either be done by the user providing a general moment by moment indication of the degree of satisfaction with a particular program, or by the user providing specific responses to a questionnaire. In practice the least expensive and most effective mode to employ would be one of the off-line modes. The material to be rated may be listened to on a radio station or viewed on the users television 3 with the polling device 13 periodically displaying screens with questions to be answered. When the material to be rated is a television program coming from the standard broadcast signal then the microprocessor 43 would switch the source of material to be displayed on the television 3 using the screen/television signal 120 to switch the relay switch 75 between its two sources.

The responses from the viewer would be stored as response data along with the time at which the response was received. The central computer 2 can, at a later time, correlate the time of the response data with the time at which the event occurred to determine the moment to moment responses of the viewer.

The LED display 54 may be caused to light up in sympathy with the response data from the transmitter 19. For instance, a viewer may be requested to rate a television program on a scale from one to five. If the viewer responds through the transmitter 19 with a three, the microprocessor 43, in addition to storing the response in RAM 51, will light three of the LEDs in the LED display 54 through the latch 53. This could be done on a moment to moment basis throughout a program.

Often a questionnaire will be designed to run at the same time as the event or program. Thus, the screen data of the questionnaire can be time-stamped so that the microprocessor 43 will not allow access to the given screen data in the RAM 51 until a given time on the clock 60.

It should also be noted that whilst responses will often be stored in the RAM 51 prior to transmission, the responses can be forwarded to the central computer in an on-line mode.

Although the four modes were discussed with respect to telephone connections originated by the microprocessor 43, the modem 41 has the capability of detecting and recognizing a ring signal from an incoming call. The microprocessor 43 can close the relay 38 to communicate with the source of the call, typically the central computer 25. Thus where the microprocessor 43 previously was described to dial the computer 25 it is possible to have the computer 25 dial the microprocessor 43. Instances where this may be desirable would be to transmit screen data to the microprocessor 43 at a time convenient to the central computer 25 and not at a time predetermined by the clock 60. Similarly, response data may be collected from the RAM 51 through the microprocessor 43 at a convenient time instead of at a time given by the clock 60.

The advantages of the polling device 13 and the polling system 1 over prior systems are evident. Screen data can come from either FM or telephone sources. the multiple transmission FM source allows for inexpensive mass transmission or the flexibility of addressing individual units through the password system. Multiple FM sources, on different frequencies, can be tuned in by the FM receiver allowing for multi-channel data. The on-line modes allow for the transmission of up-to-date screen data or screen data which would be otherwise too large for the capacity of the RAM 51 of the polling device 13. Off-line modes place the desired screens at the ready so that the viewer may view the screens at his/her own speed. The viewer does not have to wait for the screens to be transmitted at what may be a slower than desired rate due to any technical limitations on the rate of transmission. Additionally, as screen data is no longer on a loop transmission the viewer will enter at the beginning of a screen sequence and does not have to wait for the presently transmitting screen loop to finish to begin his/her questionnaire.

The use of the modems 23 and 41 combined with the infrared transmitter 19 as part of an input means allows the viewer to simply perform the manual input of responses. This saves the polling company from having to manually input all the responses into its computer 25. Thus the analyzing to be performed by the company can be performed by the computer 25 on response data previously entered by the viewer.

Additionally, the use of an off-hook sensing apparatus allows the device to be used in conjunction with the subscriber's telephone 17 saving the cost of a dedicated telephone line. Further, to enable screen data or response data to be transmitted remotely, a ring suppression means can be included, for suppressing ringing of the telephone, during such transmissions.

Moment to moment response surveys can be performed in the familiar setting of the viewers home.

It is to be understood that other embodiments of the invention will fall within its spirit and scope as defined by the following claims.

I claim:

1. A system for remotely displaying screen data as screens on viewing apparatus, the system comprising:
   a plurality of commercial radio band carrier transmitters, each of the transmitters encoding and transmitting screen data on differing commercial radio band carriers; and
   a plurality of devices each being for use with a corresponding viewing apparatus and comprising a band receiver adapted to receive an encoded band carrier and including a band tuner for tuning the band receiver to a selected band carrier, a band carrier decoder connected to the band receiver, the band carrier decoder being adapted to decode the screen data from the received band carrier, and a display signal means connected to the band carrier decoder, the display signal means being adapted to produce from the screen data a display signal representing the screens to be displayed and data storage means connected to the band carrier decoder for storing screen data from the band carrier decoder;
   whereby each viewing apparatus when connected to the display signal means of a respective device accepts the display signal and displays the screens.

2. A system according to claim 1 further comprising, a central computing means connected to the band carrier transmitters, the central computing means being adapted to store and retrieve screen data and to route and transmit screen data to the band carrier transmitters for transmission on the differing band carriers.

3. A system according to claim 2, further comprising, for each device a viewer control means coupled to the display signal means and capable of controlling when the display signal is produced.

4. A system according to claim 3 wherein the data storage means is also connected to the display signal means, and wherein the display signal means is additionally adapted to retrieve stored screen data from the storage means and the viewer control means is additionally coupled to the storage means for controlling selection of the source of screen data for the display signal means from the band carrier decoder and the storage means.

5. A system according to claim 4, wherein each device includes a processor unit connected to the respective band carrier decoder, display signal means, and storage means.

6. A system according to claim 3 or 4, wherein, for each device, the viewer control means is additionally coupled to the band tuner and is capable of controlling the band tuner to select a device band carrier.

7. A system according to claim 5, wherein, for each device, the viewer control means is additionally coupled to the band tuner and is capable of controlling the band tuner to select a desired band carrier.

8. A system according to claim 7, for additionally remotely transmitting responses from viewers to the central computing means, the system further comprising:
   for each device, a response data input means including the viewer control means, the response data input means accepting responses from the viewer and translating the responses into response data;
   for each device, a first telephone carrier encoder connected to the response data input means, the first telephone carrier encoder being adapted to encode a first telephone carrier with the response data and send the encoded first telephone carrier;
   a telephone carrier transmission means connected between the first telephone carrier encoders and the second telephone carrier receiver;
   a second telephone carrier receiver associated with the central computing means and adapted to receive the first encoded telephone carrier;
   a second telephone carrier decoder connected to the second telephone carrier receiver, the second telephone carrier decoder being adapted to decode the response data from the first telephone carrier;
   wherein the central computing means is additionally connected to the second telephone carrier decoder;
   whereby the response data can be transmitted to the central computing means by the first telephone carrier encoder over the transmission means through the second telephone carrier receiver and decoder.

9. A system as claimed in claim 8, wherein the storage means of each device is capable of storing response data for later transmission to the central computing means.

10. A system according to claim 9, the system further comprising:
    a second telephone carrier encoder connected between the telephone transmission means and the central computing means and being adapted to encode and transmit screen data;
    for each device, a first telephone carrier receiver being connected to the telephone carrier transmission means to receive a second encoded telephone carrier;
    for each device, a first telephone carrier decoder connected to the respective telephone carrier receiver, which first telephone carrier decoder is adapted to decode the screen data from the encoded second telephone carrier; and
    for each device, a decoder selector connected to the first telephone carrier decoder and between the band decoder and the display signal means, the selector selecting between the screen data from the first telephone carrier decoder and the screen data from the band carrier decoder.

11. A system according to claim 10, wherein, for each device, the viewer control means is additionally coupled to the decoder selector and is capable of controlling the decoder selector.

12. A system according to claim 11, wherein, for each device, the telephone carrier transmission means is connected to the first telephone carrier encoder and receiver via a ring suppression means, for suppressing a ring signal received from the telephone carrier transmission means.

13. A system according to claim 9, 10 or 11, which includes, for each device, an off-hook sensing means connected between the telephone carrier transmission means and the first telephone carrier encoder, the sensing means being adapted to sense an increased load attenuation on the transmission means indicative of a conventional telephone receiver being lifted, and to disconnect the first telephone carrier encoder from the transmission means when such an increased load is sensed.

14. A system as claimed in claim 10, 11 or 12, wherein each device includes an indicator means for indicating the presence of stored screen data therein.

15. A system as claimed in claim 10, 11 or 12, wherein, for each device, the viewer control means forms a discrete, separate part of the device, and the other part of the device includes an indicator means, capable of indicating a response received from the viewer control means and the presence of screen data stored in the storage means.

16. A system as claimed in claim 5, 7 or 12, which includes a relay switch means having an input for a conventional television signal, an input connected to the display signal means, and an output connectable to a television providing the viewing apparatus, the relay switch means being connected to and controlled by the viewer control means, for selection of the display signal means or the conventional television signal as the input to the television.

17. A system for remotely displaying screen data as screens on a viewing apparatus, the system comprising:
    a central computing means;
    a transmitter connected to the central computing means for transmitting screen data;
    a plurality of devices each being for use with a corresponding viewing apparatus and comprising a receiver means adapted to receive an encoded carrier, a decoder means connected to the receiver means for decoding a carrier, a display signal means connected to the receiver means, for producing from the screen data a display signal representing the screens to be displayed, a response data input means including a viewer control means, the response data input means accepting responses from the viewer and translating the responses into response data, an encoder means connected to the response data input means, for encoding response data, a transmission means for transmitting encoded response data to the central computer, and a storage means for storing both screen data and response data.

18. A system as claimed in claim 17, in which each device includes a first telephone carrier encoder and a first telephone carrier receiver, and the central computer is provided with a second telephone carrier receiver and a second telephone carrier encoder, and the system includes a telephone transmission means connected between the first and second telephone carrier encoders and receivers, whereby screen data can be transmitted to each device over the telephone transmission means, and response data can be transmitted over the telephone transmission means from each device to the central computer.

19. A system as claimed in claim 17 or 18, wherein each device includes an indicator means, for indicating at least one of the presence of screen data received and stored in the storage means and response data from a user.

20. A device for use in an interactive system for remotely viewing screen data as screens on a viewing apparatus, the screen data being encoded and transmitted on one of a plurality of commercial radio band carriers, and for remotely transmitting responses from a viewer as response data to a central computer via a response data encoded telephone carrier, the device comprising:
   a band receiver adapted to receive the encoded band carrier, and including a band tuner for tuning the band receiver to a selected band carrier;
   a band carrier decoder connected to the band receiver, the band carrier decoder being adapted to decode the screen data from the received band carrier; and
   a display signal means connected to the band carrier decoder, the display signal means being adapted to produce from the screen data a display signal representing the screens to be displayed;
   a response data input means, including a viewer control means, the response data input means accepting responses from the viewer and translating the responses into response data; and
   a first telephone carrier encoder connected to the response data input means, the telephone carrier encoder being adapted to encode a telephone carrier with the response data;
   whereby a viewing apparatus when connected to the display signal means accepts the display signal and displays the screens; and
   the response data can be transmitted to the central computer by the telephone carrier encoder when a telephone line is connected between the telephone carrier encoder and the central computer.

21. A device according to claim 20, further comprising a screen data storage means connected to the band carrier decoder and to the display signal means, the screen data storage means being adapted to store screen data from the band carrier decoder, and wherein the display signal means is additionally adapted to retrieve stored screen data from the storage means and the viewer control means is additionally capable of controlling whether the source of screen data for the display signal means is the band carrier decoder or the storage means.

22. A device as claimed in claim 21, which includes a processor unit connected to and controlling the band receiver, the display signal means, the response data input means, the first telephone carrier encoder and the data storage means, and wherein the data storage means can additionally store response data from the response data input means.

23. A device according to claim 22, wherein the viewer control means is coupled to the processor unit and to the display signal means, the viewer control means being capable of controlling when the display signal is produced.

24. A device as claimed in claim 23, which includes a relay switch means having an input for a conventional television signal, an input connected to the display signal means and an output for connection to a television, providing the viewing apparatus, the relay switch means being controlled by the viewer control means to select which input is connected to the output.

25. A device according to claim 20, 22 or 24, wherein the viewer control means is additionally capable of controlling the band tuner to select the selected band carrier.

26. A device according to claim 20, adapted for receiving screen data encoded and transmitted on a telephone carrier, the device further comprising:
   a telephone carrier receiver adapted to receive the encoded telephone carrier;
   a telephone carrier decoder connected to the telephone carrier receiver, the telephone carrier decoder being adapted to decode the screen data from the telephone carrier; and
   a decoder selector being connected to the telephone carrier decoder and between the band decoder and the display signal means, the selector selecting between the screen data from the telephone carrier decoder and the screen data from the band decoder.

27. A device as claimed in claim 24, adapted for receiving screen data encoded and transmitted on a telephone carrier, the device further comprising:
   a telephone carrier receiver adapted to receive the encoded telephone carrier;
   a telephone carrier decoder connected to the telephone carrier receiver, the telephone carrier decoder being adapted to decode the screen data from the telephone carrier; and
   a decode selector being connected to the telephone carrier decoder and between the band decoder and the display signal means, the selector being controlled by the viewer control means, whereby the selector selects between the screen data from the telephone carrier decoder and the screen data from the band decoder.

28. A device as claimed in claim 27, wherein the viewer control means can instruct the processor unit in advance, to store selected screen data in the storage means for later display.

29. A device as claimed in claim 27 or 28, which includes a ring suppression means, for suppressing the ringing of a conventional telephone, to enable response data to be retrieved from the storage means or screen data to be transmitted to the storage means over a telephone line associated with that telephone.

30. A device as claimed in claim 27 or 28, which includes a ring suppression means, for suppressing the ringing of a conventional telephone, to enable response data to be retrieved from the storage means, or screen data to be transmitted to the storage means over a telephone line associated with that telephone, and which also includes an indication means for indicating the presence of stored screen data in the storage means.

31. A device as claimed in claim 27 or 28, which comprises a main unit, and a separate discrete unit comprising the viewer control means, and wherein the main unit includes visual indication means for indicating a users responses.

32. A device as claimed in claim 27 or 28, which includes a ring suppression means, for suppressing the ringing of a conventional telephone, to enable response data to be retrieved from the storage means or screen data to be transmitted to the storage means over a telephone line associated with that telephone, and wherein the device comprises a main unit and a separate, discrete unit comprising the viewer control means, with the main unit including indication means for providing an indication of a users responses and the presence of screen data stored in the storage means.

33. A device as claimed in claim 27, which includes an off-hook sensing means for sensing when a telephone connected to the same telephone transmission line as the first telephone carrier encoder is in an off-hook condition, by sensing an increased load attenuation, and to interrupt transmission of response data or receipt of screen data.

34. A device for use in an interactive system for remotely viewing screen data as screens on a viewing apparatus, the screen data being encoded and transmitted on a radio band carrier, and for remotely transmitting responses from a viewer as response data to a central computer via a response data encoded telephone carrier, the device comprising:
 a receiver adapted to receive the encoded carrier;
 a decoder connected to the receiver, and adapted to decode screen data from the received carrier;
 a display signal means connected to the decoder, the display signal means being adapted to produce from the screen data a display signal representing the screens to be displayed;
 a response data input means, including a viewer control means, the response data input means accepting responses from the viewer and translating the responses into response data;
 a first telephone carrier encoder connected to the response data input means, the telephone carrier encoder being adapted to encode a telephone carrier with the response data; and
 a storage means adapted to store both screen data for later display, and response data prior to transmission over the telephone carrier.

35. A device as claimed in claim 34, which includes a telephone carrier encoder connected to the display signal means, with the display signal means selecting either the decoder connected to the receiver or the telephone decoder as the source for the screen data.

36. A device as claimed in claim 15, which includes a relay switch means having one input for a conventional television signal and another input receiving the display signal from the display signal means, and an output for connection to a television, providing the viewing apparatus, the relay switch means being controllable by the viewer control means, to select either the conventional television signal or the display signal for display on the television.

37. A method for remotely displaying screen data as screens on a viewing apparatus, the method comprising:
 encoding and transmitting screen data on differing commercial radio band carriers;
 tuning and receiving a selected band carrier;
 decoding the screen data from the selected band carrier;
 storing the screen data decoded from the selected band carrier; and
 producing from the screen data a display signal representing the screens to be displayed;
 whereby the screens may be displayed on the viewing apparatus when the viewing apparatus accepts the display signal.

38. A method as claimed in claim 37 further comprising selecting as a source for the display signal one of the stored screen data and the screen data being received.

39. A method as claimed in claim 37, which includes the additional steps of:
 accepting responses from a viewer of the viewing apparatus and converting the responses into response data;
 encoding the response data onto a suitable response carrier;
 transmitting the encoded response carrier;
 receiving the encoded response carrier;
 decoding the response data from the response carrier.

40. A method as claimed in claim 38 with the additional steps of:
 accepting responses from a viewer of the display signal on a viewing apparatus, and converting the responses into response data;
 encoding a first telephone carrier with the response data;
 sending the encoded first telephone carrier;
 receiving the encoded first telephone carrier;
 decoding the response data from the first telephone carrier.

41. A method as claimed in claim 38, which includes the additional steps of:
 encoding a second telephone carrier with screen data and transmitting the encoded second telephone carrier;
 receiving the encoded second telephone carrier;
 decoding the screen data from the encoded second telephone carrier; and
 selecting between screen data decoded from the second telephone carrier, screen data decoded from the selected band carrier, and stored screen data.

42. A method as claimed in claim 41, which includes providing an indication to the viewer, when screen data is stored ready for use.

43. A method as claimed in claim 39, 41 or 42, which includes the prior selection of desired screen data for storage, which screen data are later automatically stored, for later viewing by the viewer.

44. A method as claimed in claim 40, in which response data are directly transmitted to a central computing means.

45. A method as claimed in claim 40, which includes storage of the response data, prior to transmission via the first telephone carrier to a central computing means.

46. A method as claimed in claim 45, wherein the central computing means automatically uploads stored response data.

47. A method as claimed in claim 46, wherein the response data for each of a plurality of individual locations is stored at that location, and the central computing means automatically and sequentially uploads response data from the individual locations.

48. A method as claimed in claim 46, wherein the viewer provides an instruction for later uploading of the stored response data by the central computing means.

49. A method as claimed in claim 44, 47 or 48, which includes a user providing a response which is a moment by moment response to viewed screens.

50. A method as claimed in claim 49, in which a visual indication is provided to the user of the moment by moment response.

51. A method as claimed in claim 44, 47 or 48, in which the viewer can instruct the later storage of desired screen data, for later viewing by the viewer, and in which an indication is given to the viewer of stored screen data.

52. A method as claimed in claim 44, 47 or 48, which includes the additional steps of:
   at the central computing means encoding a second telephone carrier with screen data and transmitting the encoded second telephone carrier;
   receiving the encoded second telephone carrier;
   decoding the screen data from the encoded second telephone carrier; and
   selecting between the screen data decoded from the second telephone carrier, the screen data decoded from the selected band carrier, and stored screen data, for generating the display signal, an indication being given of the presence of any stored screen data.

53. A method as claimed in claim 44, 47 or 48, which includes the additional steps of:
   at the central computing means encoding a second telephone carrier with screen data and transmitting the encoded telephone carrier;
   receiving the encoded second telephone carrier;
   decoding the screen data from the encoded second telephone carrier;
   selecting between the screen data decoded from the second telephone carrier, the screen data decoded from the selected band carrier, and stored screen data, for generating the display signal;
   enabling the viewer to instruct the later recordal of desired screen data;
   recording the moment by moment response of the viewer to a set of screens; and
   providing a visual indication both of the presence of stored screen data and the viewers moment by moment response.

54. A method as claimed in claim 38 or 40, which includes connecting the display signal to a relay switch means which also receives a conventional television signal, connecting a television as the viewing apparatus to an output of the relay switch means and activating the relay switch means to select either the display signal or the conventional television signal for display on the television.

55. A method of remotely displaying screen data as screens on a viewing apparatus and recording responses from a viewer, the method comprising:
   encoding and transmitting screen data on a carrier;
   receiving and decoding the screen data from the carrier;
   producing from the screen data a display signal representing the screens to be displayed;
   viewing the screens on a viewing apparatus;
   accepting responses from the viewer and converting the responses into response data;
   encoding a response carrier with the response data;
   sending the encoded response carrier to a central computing means;
   receiving the encoded response carrier;
   decoding the response data from the encoded response carrier; and
   at the viewing apparatus storing both received screen data and response data for transmission, whereby viewing of the screens and transmissions of the response data can be delayed.

* * * * *

UNITED STATES PATENT AND TRADEMARK OFFICE
CERTIFICATE OF CORRECTION

PATENT NO. : 4,829,558

DATED : May 9, 1989

INVENTOR(S) : Russell J. Welsh

It is certified that error appears in the above-identified patent and that said Letters Patent is hereby corrected as shown below:

In Claim 27, Column 16, Line 46

Change "decode" to --decoder--.

Signed and Sealed this

Twenty-third Day of January, 1990

*Attest:*

JEFFREY M. SAMUELS

*Attesting Officer*     *Acting Commissioner of Patents and Trademarks*